Feb. 28, 1961    H. W. G. HIGNETT ET AL    2,972,805
PRODUCTION OF HOLLOW METAL ARTICLES
Filed June 19, 1957    4 Sheets-Sheet 1
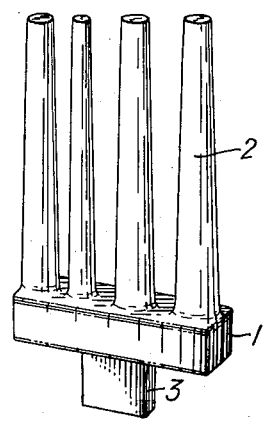
Fig./.
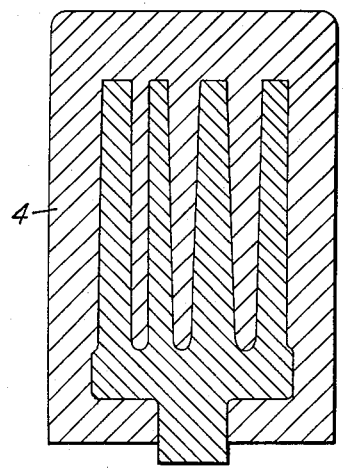
Fig.2.
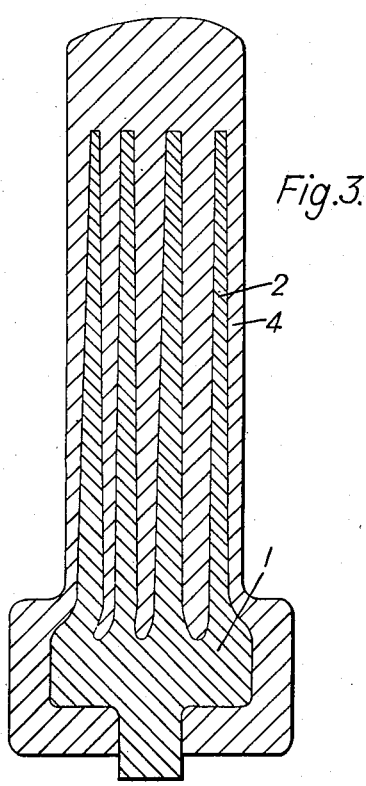
Fig.3.
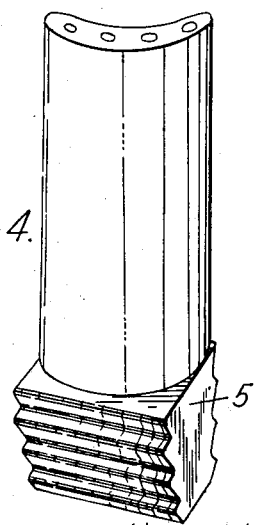
Fig.4.
Harold W.G. Hignett
Philip G. Turner
*Inventors*
By G. W. Deller
*Attorney*

Feb. 28, 1961  H. W. G. HIGNETT ET AL  2,972,805
PRODUCTION OF HOLLOW METAL ARTICLES
Filed June 19, 1957  4 Sheets-Sheet 3
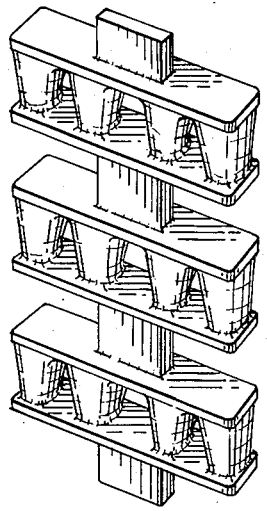
Fig. 13.
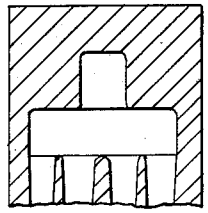
Fig. 15.
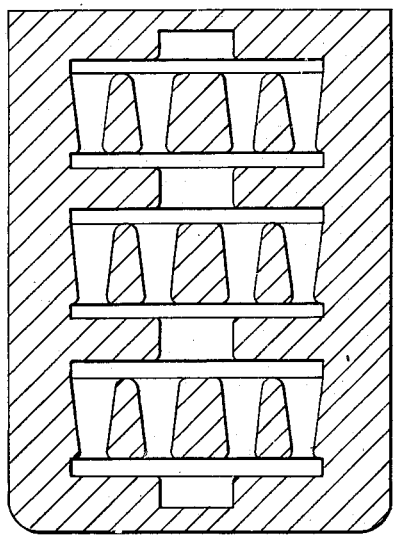
Fig. 14.
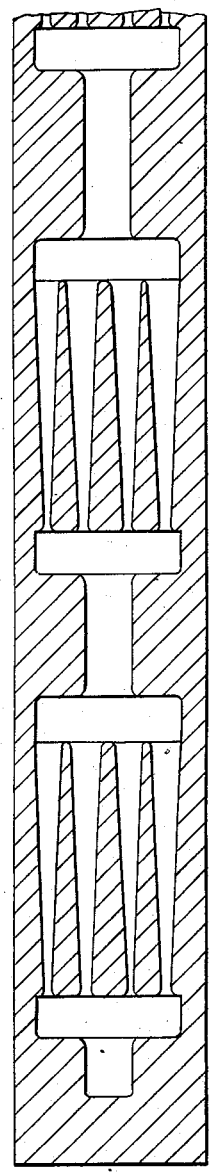
HAROLD W.G.HIGNETT
PHILIP G. TURNER
Inventors
By *G. Or. Deller*
Attorney

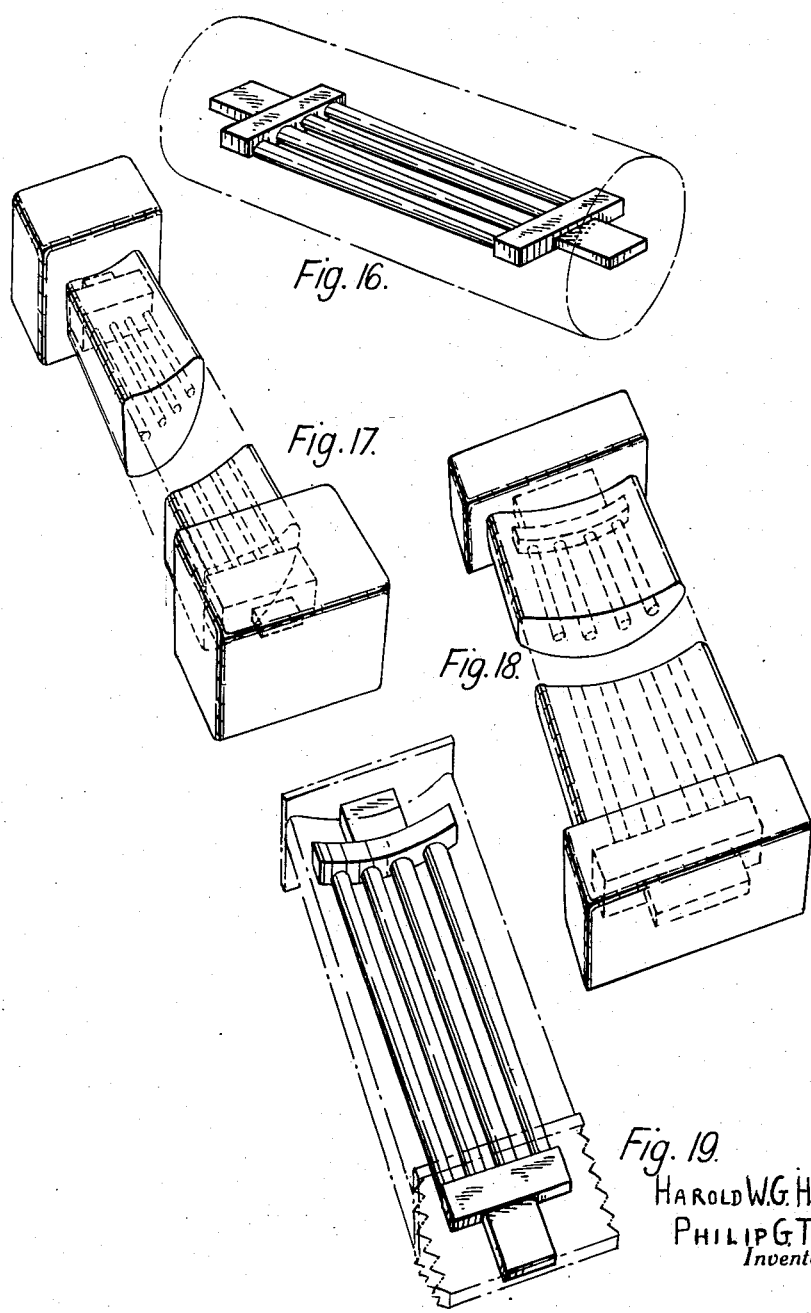

2,972,805
PRODUCTION OF HOLLOW METAL ARTICLES

Harold W. G. Hignett, Harborne, Birmingham, and Philip G. Turner, Inkberrow, England, assignors to The International Nickel Company, Inc., New York, N.Y., a corporation of Delaware Filed June 19, 1957, Ser. No. 666,541

Claims priority, application Great Britain June 20, 1956

2 Claims. (Cl. 29—156.8)

One way of making articles with holes in them is to drill holes in a billet, fill these holes with inserts of a filler material, extrude or otherwise hot-work the billet and finally remove the filler. One advantage of the process is that it enables holes of very small cross-sectional area to be produced in the finished article. In particular cooled turbine blades, that is, turbine blades having hollow passages within their form to admit the flow of a cooling medium, may be made in this way. Not only must such passages be very small but also they should not be circular. Only round holes can be made by drilling, but a round insert can be deformed to non-circular shape on extrusion of the filled billet through an appropriate die or by other appropriate hot-working operation.

Now if an insert of right-cylindrical form is used in the billet from which a blank for a cooled blade is to be produced by extrusion or forging, or both, the final form of the cooling passage corresponding to this insert is governed by the external form of the blade. In a blade having an aerofoil section which tapers from root to tip, the cross section of the cooling passage will also decrease from root to tip. This is a disadvantage in certain cases because of the increase in back pressure caused to the cooling air. Furthermore, it is difficult to arrange for the cooling passages to run parallel to the external form of the aerofoil, as is desirable in order to provide uniformity of cooling.

According to the invention we cast the metal round a preformed insert to form a billet and we reduce the grain size of the metal while it is solidifying. We then hot-work the cast billet to form a blank for the final product, or even the final product itself, with reduction in the cross-sectional size of the billet. Subsequently we remove the insert. Alternatively the insert round which the metal is cast may serve simply to shape the holes and may then be removed to allow a filler of the desired flow characteristics to be introduced into the holes.

It is known to produce a cast turbine blade with cooling passages by the lost-wax process, the metal being cast around wires of a material which is subsequently removed to form the passages. However, wrought turbine blades and other articles subjected to stress at high temperatures have better properties, e.g. resistance to fatigue and thermal shock, then the same articles cast from identical alloys, so it is desirable to produce the blades or other articles by processes involving metal-working steps.

Another disadvantage of directly casting the articles into their final form is that the alloys commonly used, particularly nickel-chromium and nickel-chromium-cobalt alloys containing elements which form a precipitation-hardening phase, are very difficult to cast into intricate shape, because the alloys have bad properties of flow. In the present invention, on the other hand, failure of the metal cast around the filler to acquire an intricate shape is not important, because the deficiencies are remedied in the subsequent steps. Moreover, in a direct casting process the filler used to form cooling passage must be of very small cross-sectional area and may be fragile, whereas in the present invention a filler, even of complex shape, can be robust, as it is to be reduced in cross-section in the working steps.

Cast alloys, particularly the nickel-chromium and nickel-chromium-cobalt alloys mentioned above, tend to be coarse-grained. If a coarse-grained alloy is deformed, the cross-sectional shape of filled holes in it may become so irregular during the deformation that the resultant passages are no longer suitable for their purpose.

For this reason the metal as cast should have as fine a grain structure as possible, and therefore the grain size is reduced during the solidification. This reduction may be effected in any convenient way; for example, the metal may be cast at a low temperature in order to cause as much as possible of it to freeze simultaneously and thus to provide the minimum opportunity for the growth of large grains. Again, the metal may be subjected to electromagnetic action as it solidifies, or the mould may be vibrated at sonic or supersonic frequencies. Yet again, the metal may be "seeded" during casting by the addition of powdered material having the same crystal structure as the parent metal to provide extra nuclei for crystal formation during solidification.

It will be appreciated that the normal method for the machining of internal passages is limited to the drilling of right cylindrical holes, and complex shapes can only be produced by expensive further machining such as broaching. In the present invention the use of a preformed insert opens up the possibility of producing internal passages of the most complex and varied form.

When the billet is worked with the insert in position, this insert is of filler material having the desired capacity for flowing with the metal of the billet. If it is of such filler material, it may be of metal, e.g. an iron-manganese-titanium alloy, and be made by precision casting. Again, the filler material may be a sintered composition of iron and magnesia. Such fillers can easily be removed by acid leaching after the deformation.

Preferably the insert is so disposed within the mould as to be exposed at one or both ends of the cast billet made in the mould, since the subsequent leaching of the filler material is then accelerated, particularly if it is attacked from two opposed ends.

When a temporary insert is used and is replaced by another, it is frangible, e.g. of silica, zirconia or other refractory material, and is removed by breaking. The breaking may be done by hand using a fine probe, and the broken insert may be shaken out of the holes.

The advantage of using a frangible filler such as a preformed rod of silica is that it is fairly soft during the cooling of the cast billet and will not cause cracking during the contraction on cooling.

In any case the inserts may be of such a shape that in making a turbine blade from a cast billet containing either the inserts or filler replacing them the deformation of the cast billet to provide the final shape of the cooled blade produces at the same time the desired final shape of the cooling passages. It is possible to produce cooling passages running parallel to the surface of the blade which are collected either in the root or in a shroud of the blade, or both, and which emerge through the centre of the root or the centre of the shroud through one single passage which does not interfere with the means of fitting the blade to a rotor disc, be it by the normal firtree method or any other recognized means.

It is also a great advantage that no holes have to be drilled in a billet. In a nickel-chromium-cobalt alloy such as is used for turbine blades working at very high temperatures, to drill a ⅜" diameter hole of length 5 inches requires a time of 20 minutes. It is extremely difficult indeed to drill holes of any useful length less than 1/8" diameter.

Some processes according to the invention and advantages will become apparent from the following description taken in conjunction with the drawings in which Figure 1 shows a precision-cast insert comprising a base 1, four branches 2 and a spigot 3 which enters a cavity in the base of a mould and so locates the insert in the mould;

Figure 2 shows a billet produced by casting an alloy 4 round the insert;

Figure 3 shows the product of partial extrusion of the billet. The leading end has been extruded through a die of roughly aerofoil section so that the branches 2 have all been extended longitudinally and become narrower in cross-section, whereas the base 1 remains unchanged;

Figure 4 shows a turbine blade having a blade section accurately machined from the product of Figure 3 and a firtree root 5 machined from the base 1. On removing the material of the insert by acid-leaching a manifold is produced in the root 5 of the blade and four passages corresponding to the original branches 2 run through the length of the blade.

Figure 5:
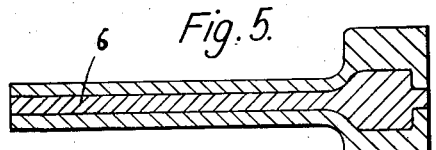
Figure 6:
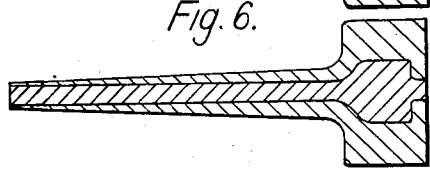
Figure 7:
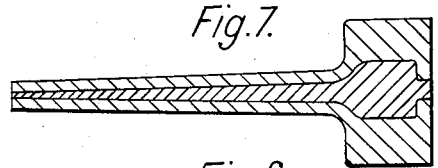
Figure 8:
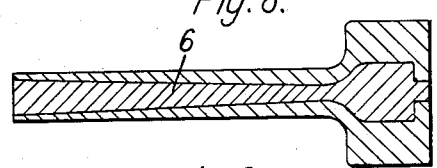
Figure 9:
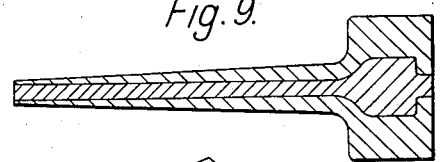

Figures 5 to 9 illustrate some of the many possible ways in which the dimensions of the passages can be controlled. Figure 5 is a section through a partially-extruded billet containing an insert having branches 6 of uniform cross-sectional area. Figure 6 shows a product obtained by machining the shank part of the billet to blade section, and Figure 7 shows a product obtained by taper-rolling the shank to blade section. Figure 8 shows a partially extruded billet in which the branches 6 of the insert decrease in cross-sectional area from their ends to the base, and Figure 9 shows the result of taper-rolling the shank of this billet to blade section. It will be seen that in Figure 9 the branches have become substantially of uniform cross-section throughout their length, whereas the blade tapers from root to tip. This result is particularly advantageous and is difficult to achieve by any other method.

Figure 10:
Figure 11:
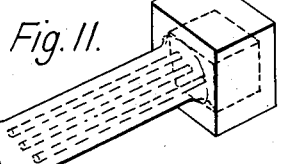
Figure 12:
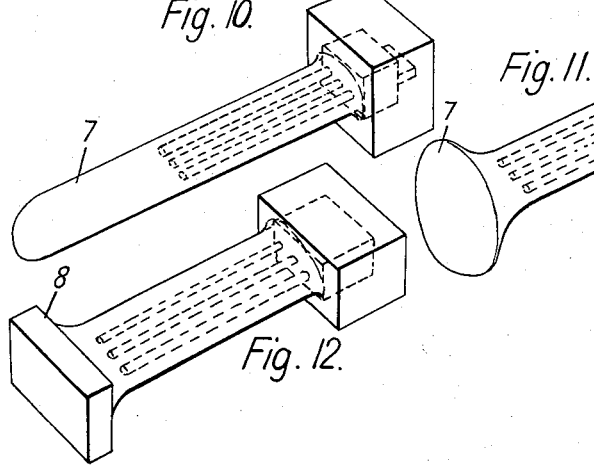

Figures 10 to 12 show how a shroud can be formed. A billet is produced by casting round an insert to leave a substantial mass of metal 7 beyond the branches of the insert after partial extrusion, as shown in Figure 10. This mass of metal is then upset to substantially the shape shown in Figure 11, an operation which can be performed without disturbing the branches. Finally the mass is upset to the shroud shown at 8 in Figure 12.

The inserts required for a number of blades can be produced as a unit, as shown in Figure 13 and then metal can be cast around this unit as shown in Figure 14. Extrusion of the cast product shown in Figure 14 produces the product shown in Figure 15. This can be cut into a number of slugs, one of which is shown in Figure 16. Thereafter the slug can be machined to approximately dumbbell section, as shown in Figure 17, and then forged to produce the shape shown in Figure 18. From this the blade shown in Figure 19 can be machined.

For the purpose of giving those skilled in the art a better understanding of the invention, the following illustrative example is given.

*Example I*

A precision-cast insert as illustrated in Figure 1 is made of mild steel or alternatively may be made from a filler material such as a ferritic titanium-containing manganese steel which is conveniently removed by acid leaching. Such a filler and its use are described in the Betteridge U.S. application Serial No. 509,380. The filler arms are of "conical" form and may be of lenticular, pear shape or pseudo-elliptical form. An alloy billet is then cast round the insert as shown in Figure 2. The alloy may be an austenitic nickel-chromium alloy such as nickel-chromium-iron, nickel-chromium-cobalt or cobalt-chromium alloy. Working with an alloy of the composition carbon 0.1 max., titanium 1.8–2.7, chromium 18–21, aluminium 0.5–1.8, silicon 1.0 max., manganese 1.0 max., iron 5.0 max., cobalt 2.0 max., and nickel balance, the alloy is heated to between 1360° C. and 1390° C. and cast to a billet of parallelepiped form 2" x 1" x 3". The mould is mechanically vibrated at a frequency of 100 cycles per second and an amplitude between 0.020" and 0.050", the cast structure is greatly refined. The columnar zone depth is reduced from 2" to 0.5", the volume of equi-axed crystals being increased from 2% to approximately 40% of the total ingot volume, and the crystal size reduced to a quarter of that of crystals in unvibrated ingots.

The cast billet and filler are then heated to 1150° C. and extruded at a pressure of 60 tons per square inch to produce the partial extrusion of Figure 3. The nascent blade has a length of approximately 5" and the integral root metal an area equal to the billet of Figure 2, viz., 2" x 1" and a height of aproximately 1½". The filled holes at the base have a major axis in section of from 3/8" to 9/16" and at the tip ¼" to 1/8" respectively. The turbine blade of Figure 4 is then accurately machined from the nascent blade Figure 3 and a firtree root cut from the root metal. The blade is then subjected to acid leaching for the removal of the filler.

We claim:

1. A process for the production of a wrought fluid-cooled turbine blade blank which comprises casting a billet of heat-resistant metal around a frangible insert having a base portion, a plurality of branches affixed thereto and a spigot portion extending from said base portion while promoting the formation of a small grain size in the cast metal, removing the frangible insert from the cast billet, inserting filler in the void left after removing the insert, hot working the composite billet thus formed to substantially reduce the cross section thereof, to elongate the filler therein and to form a wrought structure in the cast portion of said billet and thereafter removing the filler therefrom to provide a wrought turbine blade blank having a plurality of cooling passages in the blade portion thereof which communicate with a manifold cavity in the root portion thereof.

2. A process as set forth and defined in claim 1, wherein the composite billet is hot worked by extrusion.

References Cited in the file of this patent

UNITED STATES PATENTS

| | | |
|---|---|---|
| 1,430,399 | Parsons et al. | Sept. 26, 1922 |
| 2,013,622 | Bedford et al. | Sept. 3, 1935 |
| 2,093,774 | Colwell | Sept. 21, 1937 |
| 2,373,405 | Lowit | Apr. 10, 1945 |
| 2,609,576 | Roush et al. | Sept. 9, 1952 |
| 2,628,417 | Peyches | Feb. 17, 1953 |
| 2,687,278 | Smith et al. | Aug. 24, 1954 |

FOREIGN PATENTS

| | | |
|---|---|---|
| 212,725 | Great Britain | Mar. 20, 1924 |
| 1,059,549 | France | Nov. 10, 1953 |
| 755,610 | Great Britain | Aug. 22, 1956 |